Nov. 19, 1940. J. A. MAURER, JR 2,222,418
INTERMITTENT MOVEMENT FOR MOTION PICTURE APPARATUS
Filed June 4, 1938   3 Sheets-Sheet 1
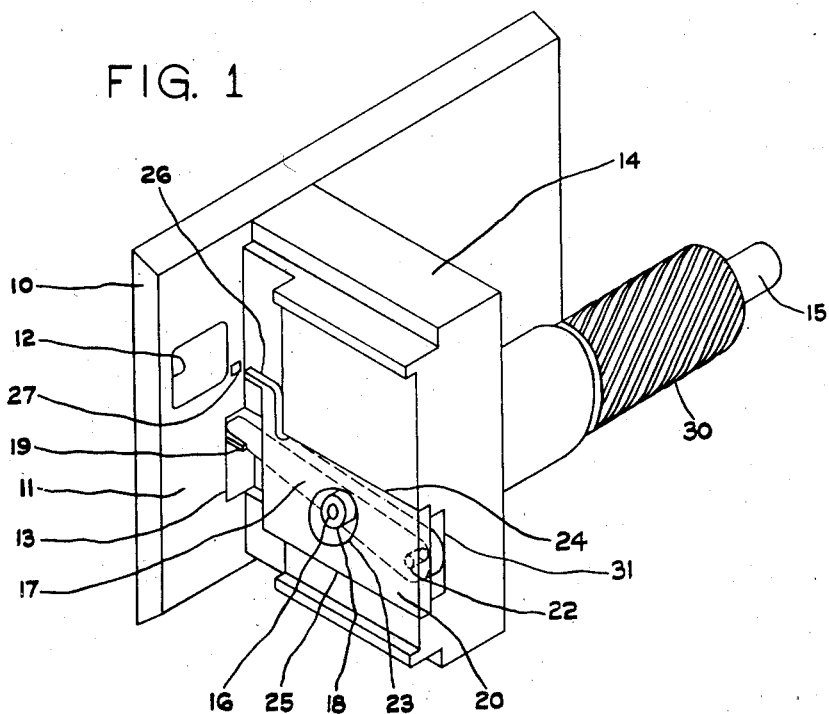
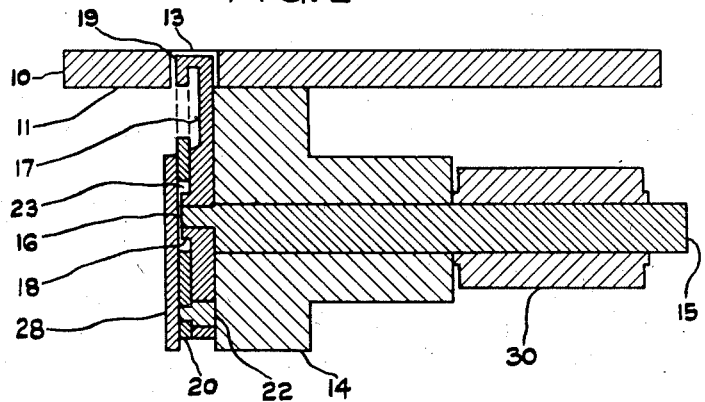
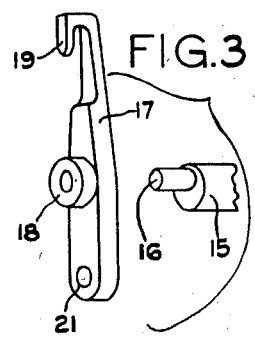
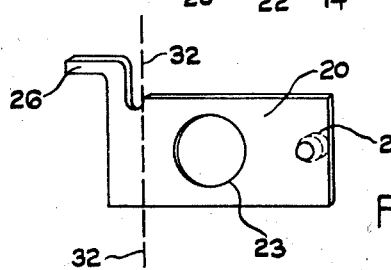
John A. Maurer, Jr.
INVENTOR.

Nov. 19, 1940.  J. A. MAURER, JR  2,222,418
INTERMITTENT MOVEMENT FOR MOTION PICTURE APPARATUS
Filed June 4, 1938   3 Sheets-Sheet 2

*John A. Maurer, Jr.*
INVENTOR.

Patented Nov. 19, 1940

2,222,418

UNITED STATES PATENT OFFICE 2,222,418

INTERMITTENT MOVEMENT FOR MOTION PICTURE APPARATUS

John A. Maurer, Jr., New York, N. Y., assignor to The Berndt-Maurer Corp., a corporation of New York Application June 4, 1938, Serial No. 211,862

7 Claims. (Cl. 88—18.4)

This invention relates to film pull-down mechanisms or intermittent movements for motion picture apparatus such as motion picture cameras.

More especially it relates to intermittent movements in which a claw periodically engages successive film perforations and so pulls down one frame of the film at a time, whereas a pilot or registry pin may hold the film definitely in position during the periods of its dwell when the exposure takes place, likewise by engaging successive film perforations.

It is one object of the invention to provide an intermittent movement of this type which is not only efficient in action, but extremely simple and easy to manufacture.

Another object of the invention is to provide an intermittent movement which is as noiseless as possible in operation, even at very high speeds. This is particularly important in sound picture work.

Another object of the invention is to provide an intermittent movement wherein mechanical wear is reduced to a minimum, and which may be operated over long periods of time without loss of adjustment.

According to the invention these objects are substantially achieved by reducing the operating parts of the intermittent movement and their connections to a minimum number.

Other objects and advantages of the invention will be apparent from the following description when read in connection with the accompanying drawings in which:

Fig. 1 is a perspective view of the apparatus with a cover plate removed,

Fig. 2 is a sectional view thereof,

Figs. 3, 4 and 5 are perspective views of certain parts used in the apparatus,

Figure 5:
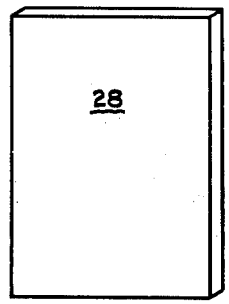

Referring to Figs. 1 to 5 inclusive, the apparatus includes an aperture plate 10, having a film-supporting surface 11, with an aperture 12, through which the film may be exposed during the periods of its dwell as it is intermittently advanced along the surface 11. Lens and shutter mechanism of standard type may be provided in front of aperture 12, and other parts of the camera, such as the rear closing member of the film gate, the feed sprocket, driving motor or like actuating means, and film magazine, may similarly be of standard construction and therefore are not shown.

A supporting block 14 is fastened to the aperture plate 10 at right angles, and has journaled in it a shaft 15 to which may be keyed a suitable driving member, such as the helical gear 30, for receiving driving torque from the camera-actuating mechanism. A stud or pin 16 is eccentrically mounted in the end of shaft 15, which terminates just below the face of block 14. An arm or lever 17 has at a point intermediate its ends a bushing 18, which fits the pin 16. This lever 17 moves in a recess 31 in block 14, and extends in a direction perpendicularly to the surface 11. At its front end it extends beyond the film path through a suitable opening 13 in the aperture plate 10. At this end the lever 17 carries a claw 19 which engages the film for pull-down action. Claw 19 engages the film from its front side, that is, from that side which faces the aperture plate 10, whereas the intermittent movement proper is located on the rear side, that is, on that side of the film which faces away from the aperture plate 10. To achieve this the lever 17 may be bent back so as to provide claw 19 integrally with itself, as shown in Fig. 3.

The lever 17 oscillates at its rear end around a pivot supported by a sliding plate 20. To that end a hole 21 may be provided in the rear end of lever 17, and a stud 22 may be mounted on the plate 20, as shown by way of example in Figs. 1 to 4. Alternatively, the stud 22 may be mounted on the rear end of lever 17, and the hole 21 may be provided in the plate 20. The sliding plate 20 has a preferably circular opening 23 into or through which the pin 16 and the bushing 18 may extend, this opening 23 being large enough to allow the pin 16 and bushing 18 to travel freely therein when the shaft 15 is rotated at a uniform rate by the camera-actuating mechanism through the driving member 30. The sliding plate 20 may advantageously be of substantial width and length relative to the other parts, and particularly it may have relatively long rectilinear bearing surfaces which can readily be machined and fitted with extreme accuracy. The sliding plate 20 is set in a guide channel on the face of block 14 having opposite parallel edges 24, 25, which are relatively long and support and guide the sliding plate 20 for reciprocating motion toward and away from the film. By its pivoted connection to sliding plate 20, the rear end of lever 17 is constrained to reciprocate in a straight line toward and away from the film.

Extending from the front end of sliding plate 20, and having in front of the pivot 21, 22, a pilot or registry pin 26 is provided to engage the film at appropriate times, as hereinafter explained. The aperture plate 10 has a small opening 27 through which the pin 26 may pass when it is in film-engaging position, while the opening 13 in the aperture plate 10 is elongated so as to allow the claw 19 to move conveniently therein.

A cover or retaining plate 28, shown in Figs. 2 and 5, may be fastened by any suitable means to the face of block 14 in order to hold the sliding plate 20 in its channel and at the same to protect the mechanism from dust and dirt. The retaining plate 28, however, may be omitted if the sliding plate 20 is held otherwise in its channel,— for example, by dovetailing it to block 14.

Figure 6:
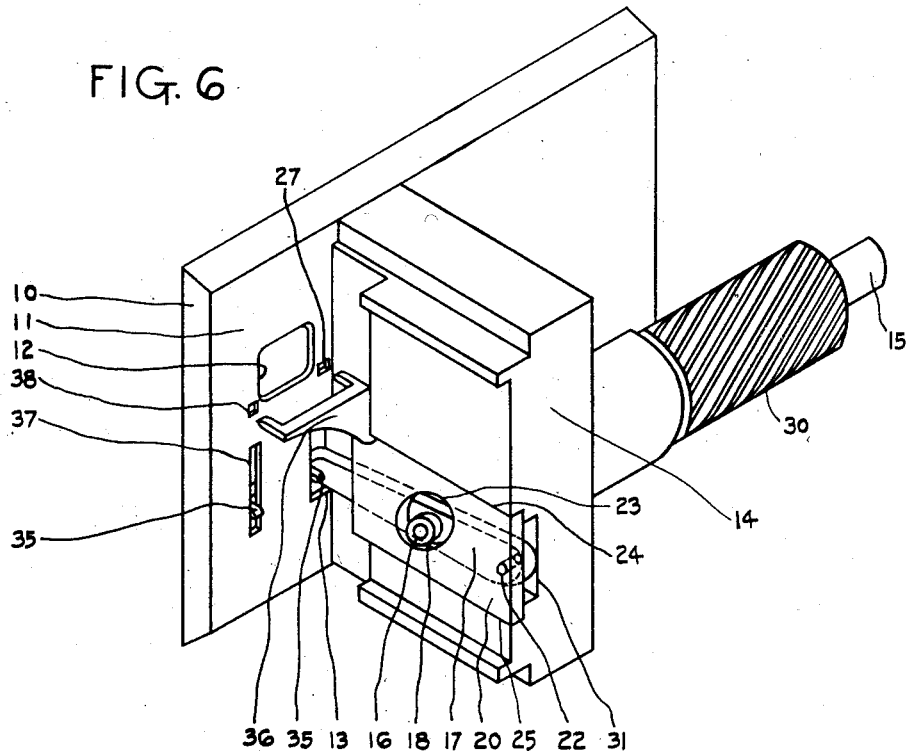
Fig. 6 is a perspective view of the apparatus shown in Fig. 1 but having a double claw, a double registry pin, and certain additional openings.
Figure 7:
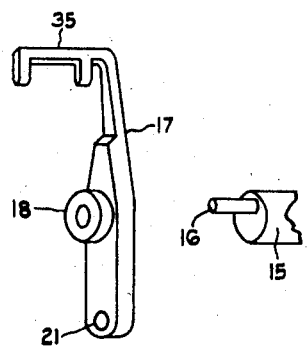
Fig. 7 is a perspective view of certain parts used in the apparatus of Fig. 6.

While the apparatus is of particular advantage with film having a single row of perforations along one side, as in the case of 16 mm. sound film, it may also be used succcessfully for films having two rows of perforations. In such case, satisfactory results may often be had with a single claw and registry pin as shown in Figs. 1 to 4. But the lever 17 and the plate 20 may also carry a double claw 35 and a double registry pin 36, and the aperture plate 10 may be provided with additional openings 37 and 38 so that claw 35 may move in openings 13 and 37, and registry pin 36 may pass through openings 27 and 38, as shown by way of example in Figs. 6 and 7.

Figure 8:
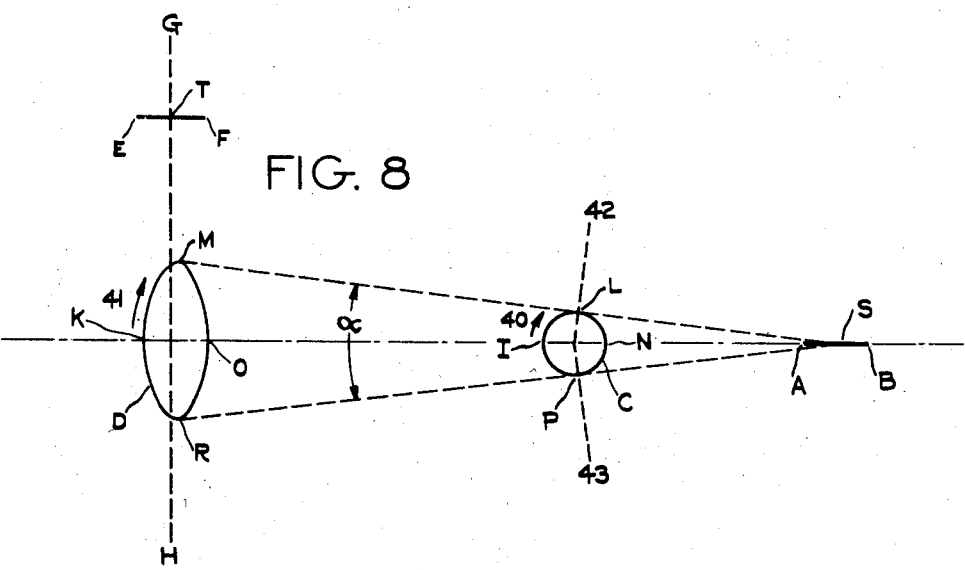
Fig. 8 is a diagram showing the movements executed by the parts of the intermittent movement.

A diagrammatic representation of the movements executed by the eccentric pin 16, the claw 19, and the registry pin 26, is shown in Fig. 8. The line A—B is the path of reciprocation of the pivot 21, 22, around which the lever 17, carrying the claw 19 at its front end, oscillates at its rear end, and which is supported by the sliding plate 20, carrying the registry pin 26. The circle C is the path of the eccentric pin 16. The approximately elliptical line D is the path of the tip of claw 19, every point on which pursues a path similar to D. The line E—F is the path of reciprocation of the registry pin 26, and the dotted line G—H shows the plane of the film.

When the eccentric pin 16 is in the position I nearest the film, the tip of claw 19 is in the position K, and the end of the registry pin 26 is in the position E. As the cycle of movement starts in the direction indicated by the arrows 40 and 41, the eccentric pin 16 moves to the position L, at which stage the tip of claw 19 is in its highest position at M. At the same time the pivot 21, 22, and the end of the registry pin 26 are at S and T respectively.

At this stage in the cycle the registry pin 26 is just leaving the film perforation, and the pulldown action commences. When the eccentric pin 16 reaches the position N, the tip of claw 19 is at O, the end of the registry pin 26 is at F, and the pivot 21, 22, is at B. The eccentric pin 16 continues its motion to the point P, at which stage the tip of claw 19 is at its lowest position R, and the pivot 21, 22, and the end of the registry pin 26 are again at points S and T, respectively. Registry pin 26 is just entering the next perforation in the film.

At this point the pull-down action ceases, and the period of dwell begins. This period of dwell extends over the remainder of the cycle, during which the eccentric pin 16 passes through I and back to L, the registry pin 26 being continuously engaged with the film, and the claw 19 being out of active engagement with it.

It will be noted that the points M and R, which mark the highest and lowest positions of the tip of claw 19 on its approximately elliptical path D, are to the right of the plane of the film G—H. Thus the tip of claw 19 is well entered through the perforation of the film before it begins to pull the film down, and likewise it is not completely withdrawn from the film at the time when the pull-down action ceases. It is therefore impossible for the movement to skip a perforation hole in pulling down the film. The tip of claw 19 is rounded and tapered in such a manner that actual pull-down contact between the claw 19 and the film begins when the claw 19 is at point M, and ceases when it reaches point R.

Furthermore, because claw 19 engages the film from its front side, the pull-down action occurs when eccentric pin 16 is moving on that half of circle C which is away from the plane of the film G—H and toward the pivot 21, 22. For this reason the pull-down action takes place during less than 180° of rotation of the eccentric pin 16. The angle of rotation during which the actual pull-down action takes place is shown by the dotted lines 42 and 43, and, as is evident from the geometrical relations in Fig. 8, this angle is less than 180° by the amount of the angle $\alpha$, which is formed by the tangents through the points L, M, and P, R, on circle C and "ellipse" D, respectively.

As shown in detail in Figs. 3 and 4, eccentric pin 16, claw 19, and registry pin 26, may be made integral with their carriers, viz., shaft 15, lever 17, and slide 20. Thus the intermittent movement according to the invention comprises only three operating parts: the shaft 15, the lever 17, and the slide 20, which are connected to each other at only two points—the shaft 15 through the eccentric pin 16 and the bushing 18 to the lever 17, and the lever 17 through hole 21 and stud 22 to the slide 20. Because the motion at these points is a purely rotary motion of round pin parts in round bushings which can be made to fit with great accuracy and freedom from backlash, the action of the movement is almost perfectly noiseless, even at very high speeds. For the same reason the mechanical wear is very slight, so that the movement may be operated over long periods of time without loss of adjustment.

It has been found that by virtue of the essentially sinusoidal nature of the motion imparted by the eccentric pin 16, the deceleration of the claw 19 is such as to bring the film uniformly to a position of complete rest when the pulldown action ceases, and that in order to hold the film in proper position during the period of its dwell, it is only necessary to provide slight pressure on the film as by the pressure plate customarily employed in film gate constructions. Hence, in appropriate cases the registry pin 26 may be omitted as indicated by the dotted line 32, 32, in Fig. 4.

Figure 9:
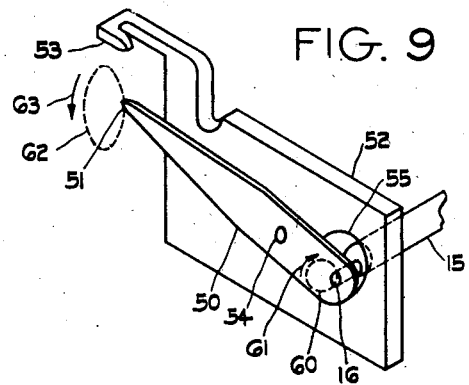
Fig. 9 is a perspective view of a modification thereof.

Although in the presently preferred embodiments of the invention, as shown in Figs. 1 to 8, the eccentric pin 16 engages the lever 17 at a point intermediate its ends, the invention may be carried out also by having the pin 16 engage the lever at its rear end, as shown, by way of example, in Fig. 9.

In this case the pull-down action occurs when the eccentric pin 16 is moving on the front half of its cycle of movement, which is indicated by the dotted circle 60 in Fig. 9, the direction of movement being shown by the arrow 61. Therefore the claw 51 carried by the lever 50 must now engage the film from its rear side, and to achieve this the front end of lever 58 may be suitably rounded and tapered, as shown in Fig. 9. The path of claw 51 is indicated by the "ellipse" 62, and its direction of movement by the arrow 63.

Furthermore, the lever 50 must now be mounted at a point intermediate its ends on the pivot mounted on slide 52. This may be achieved in any of the ways discussed hereinabove in connection with Figs. 1 to 4, for example by mounting a stud 54 on the lever 50 and providing a corresponding hole (not shown in Fig. 9) in the slide 52, or in any other suitable way.

On the other hand, if a registry pin is to cooperate with the claw 51 in this case, it must engage the film from its front side. It is necessary, therefore, that registry pin 53 extend beyond the film path and that its end be bent back, as shown in Fig. 9; registry pin 53 being carried again by the sliding plate 52 in front of the pivot 54.

Finally, in case the sliding plate 52 extends to or beyond the rear end of lever 50, as shown, a preferably circular opening 55 must now be provided in it to the rear of pivot 54.

Although its action is described herein as "pull-down," the intermittent movement need not advance the film in an actually downward direction, but may pull or push it in any direction consonant with the design of the apparatus in which it is used.

The above description is merely to illustrate certain embodiments of the invention, which is not limited to the specific arrangements shown but is of the scope of the appended claims.

What is claimed is:

1. Intermittent movement for motion picture apparatus comprising a claw adapted to engage the film from its front side; a lever carrying at its front end said claw; an eccentric engaging said lever at a point between its ends; a pivot, said lever oscillating at its rear end around said pivot; a plate having rectilinear bearing surfaces and supporting said pivot; and means guiding said plate along said rectilinear bearing surfaces for sliding motion toward and away from said film.

2. Intermittent movement for motion picture apparatus comprising a claw adapted to engage the film from its rear side; a lever carrying at its front end said claw; an eccentric engaging said lever at its rear end; a pivot, said lever oscillating at a point between its ends around said pivot; a plate having rectilinear bearing surfaces and supporting said pivot; and means guiding said plate along said rectilinear bearing surfaces for sliding motion toward and away from said film.

3. Intermittent movement for motion picture apparatus comprising a supporting block having a guide channel; a sliding plate in said channel; a pivot on the rear end of said plate and a registry pin on the front end thereof, said registry pin being adapted to engage the film from its rear side; a lever mounted at its rear end on said pivot and having a claw on its front end, said claw being adapted to engage the film from its front side; and an eccentric mounted for rotation in said block and connected to said lever intermediate the ends thereof to drive said lever and reciprocate said plate.

4. Intermittent movement for motion picture apparatus comprising a slide; a pivot and a registry pin on said slide, said registry pin being in front of said pivot and adapted to engage the film from its rear side; means providing a guide for said slide; a lever mounted at its rear end on said pivot and having a claw on its front end, said claw being adapted to engage the film from its front side; and an eccentric connected to said lever intermediate the ends thereof to drive said lever and reciprocate said slide.

5. Intermittent movement for motion picture apparatus comprising a supporting block having a guide channel; a sliding plate in said channel; a pivot on the rear end of said plate and a registry pin on the front end thereof, said registry pin being adapted to engage the film from its front side; a lever mounted intermediate its ends on said pivot and having a claw on its front end, said claw being adapted to engage the film from its rear side; and an eccentric mounted for rotation in said block and connected to said lever at the rear end thereof to drive said lever and reciprocate said plate.

6. Intermittent movement for motion picture apparatus comprising a slide; a pivot and a registry pin on said slide, said registry pin being in front of said pivot and adapted to engage the film from its front side; means providing a guide for said slide; a lever mounted intermediate its ends on said pivot and having a claw on its front end, said claw being adapted to engage the film from its rear side; and an eccentric connected to said lever at the rear end thereof to drive said lever and reciprocate said slide.

7. Intermittent movement for motion picture apparatus comprising a slide; a pivot and a registry pin on said slide, said registry pin being in front of said pivot; means providing a guide for said slide; a lever mounted at one point on said pivot and having a claw on its front end; an eccentric connected to said lever at another point thereof to drive said lever and reciprocate said slide, one of said points being at the rear end and the other intermediate the ends of said lever; and said claw and said registry pin being adapted to engage the film from opposite sides.

JOHN A. MAURER, Jr.

CERTIFICATE OF CORRECTION.

Patent No. 2,222,418.  November 19, 1940.

JOHN A. MAURER, JR.

It is hereby certified that error appears in the printed specification of the above numbered patent requiring correction as follows: Page 2, first column, line 6, for the word "having" read --hence--; page 3, first column, line 8, for "lever 58" read --lever 50--; and that the said Letters Patent should be read with this correction therein that the same may conform to the record of the case in the Patent Office.

Signed and sealed this 11th day of February, A. D. 1941.

(Seal)

Henry Van Arsdale,
Acting Commissioner of Patents.